May 31, 1955 P. H. WERENFELS 2,709,717

COLOR PHASING IN COLOR TELEVISION SYSTEMS

Filed Nov. 10, 1950 2 Sheets-Sheet 1

Inventor
Peter H. Werenfels
By
Attorney

May 31, 1955 P. H. WERENFELS 2,709,717

COLOR PHASING IN COLOR TELEVISION SYSTEMS

Filed Nov. 10, 1950 2 Sheets-Sheet 2

Inventor
Peter H. Werenfels

Attorney

United States Patent Office 2,709,717

Patented May 31, 1955

2,709,717

COLOR PHASING IN COLOR TELEVISION SYSTEMS

Peter H. Werenfels, Princeton, N. J., assignor to Radio Corporation of America, a corporation of Delaware Application November 10, 1950, Serial No. 195,107

6 Claims. (Cl. 178—69.5)

This invention relates to color television apparatus and particularly to systems for decoding sequentially transmitted color signals at a television receiver or the like.

It is necessary in color television receivers to provide means for causing color information to be dispersed in the proper sequence to a suitable color monitor. Thus, in any color sequence system, where color information is separated into a plurality of component electrical signal groups, the information reaching the color monitor of the television receiver must correspond to the transmitted electrical signal group for the respective color. This is the case whether a field, line or dot sequential system is used.

If a field sequential system is used, color wheels or rotatable color filters, which may be used in the receiver, must be properly phased with the color filters at the transmitter. Synchronization of the color wheels is in general obtained by driving synchronous motors from a power line common with the transmitter and receiver. The phasing of the color wheels may be accomplished by a system such as disclosed by G. L. Beers in U. S. Patent 2,378,746, issued June 19, 1945. Therein, a high frequency signal superimposed upon a synchronizing pulse is used to identify one color in each color sequence, and this information actuates a circuit which provides proper phasing of the rotating color wheels. Such a system is not suitable for phasing control of electronic color filtering systems, however, since the motor is not used as a synchonizing device therein. Therefore, both phasing and synchronizing circuits are necessary. It would be desirable, however, in the present invention, to obtain both phasing and synchronizing in a single simplified circuit.

In order to obtain proper operation from a decoding system for color receivers, therefore, it is necessary not only to provide a synchronizing pulse, but also an identifying color signal pulse or flag for obtaining the proper color sequence phasing. Means therefore must be developed in an electronic system to satisfactorily provide the synchronized color sequence. A synchronizing circuit is required which will not easily fall out of step, and which will be easily returned to proper operation if it does fall out of step. Since a synchronous motor has a large amount of inertia it is exceedingly difficult to return it to proper operation once it falls out of step. The electronic system therefore will provide improved performance over a mechanical system involving a synchronous motor.

In the prior art, means have been developed for electronically providing color sequence, as for example, a ring counter circuit shown and described in the U. S. application of U. S. Patent No. 2,587,005 to J. P. Smith, issued February 26, 1952, entitled "Signal Conversion System." Here also, color phasing must be done with a separate system. If the counter circuit were used in a color television receiver separate means for utilizing a color flag or phasing synchronization pulse would be necessary to keep the counting device in the proper color phase. Otherwise, the color phasing is random and when programs or cameras are switched at the transmitter studio, the receiver color phasing may be changed.

The prior art has provided systems for correcting this random color phasing by using separate phasing pulses or flags assigned to each sequential color. These systems are not completely satisfactory, however, because of the difficulty in transmitting, in addition to the required synchronization information, the proper decoding information upon each synchronization pulse so that the information may be easily separated at the receiver. A complex color flag is therefore not desirable.

The present invention is therefore directed to a combination of elements providing an improved system, whereby simplified phasing information transmitted upon the usual synchronization pulses may be utilized. The invention provides for an entirely electronic system of color separation, wherein both phasing and synchronization is simply provided by the same circuit.

Therefore, an object of the present invention is to provide an improved system in which electronic color information is both synchronized and brought into the proper phase sequence by the same simplified circuit.

Another object of the invention is to provide an improved entirely electronic color television system which firmly synchronizes and properly phases sequential video signals containing color information.

A further object of the invention is to provide a system for separating color flag information.

The invention, therefore, is directed to a three-color television system in which electrical video signals representing red, blue and green color components, or the like, are sequentially transmitted. Decoding of the sequential video color signals is obtained by a modified ring counter circuit. Color phasing is simultaneously accomplished in the counter circuit by operation of the separated color flag, which is transmitted upon every third synchronizing pulse.

The synchronization pulses used for decoding may be successive vertical synchronization pulses if a field sequential system is used or successive horizontal synchronization pulses if a line sequential system is used. At the receiver the color flags are separated and then used to start the ring counter circuit sequence. Each succeeding synchronization pulse causes a count of one step until the sequence is again initiated by the next color flag indication. The counter circuit output signal is then suitable for operation of gates or switches which properly insert the successive phased color video signals at the corresponding color monitors.

A better understanding of the invention will be provided by the detailed description of the invention which follows, when read in connection with the accompanying drawing, in which.

Figures 1, 4:
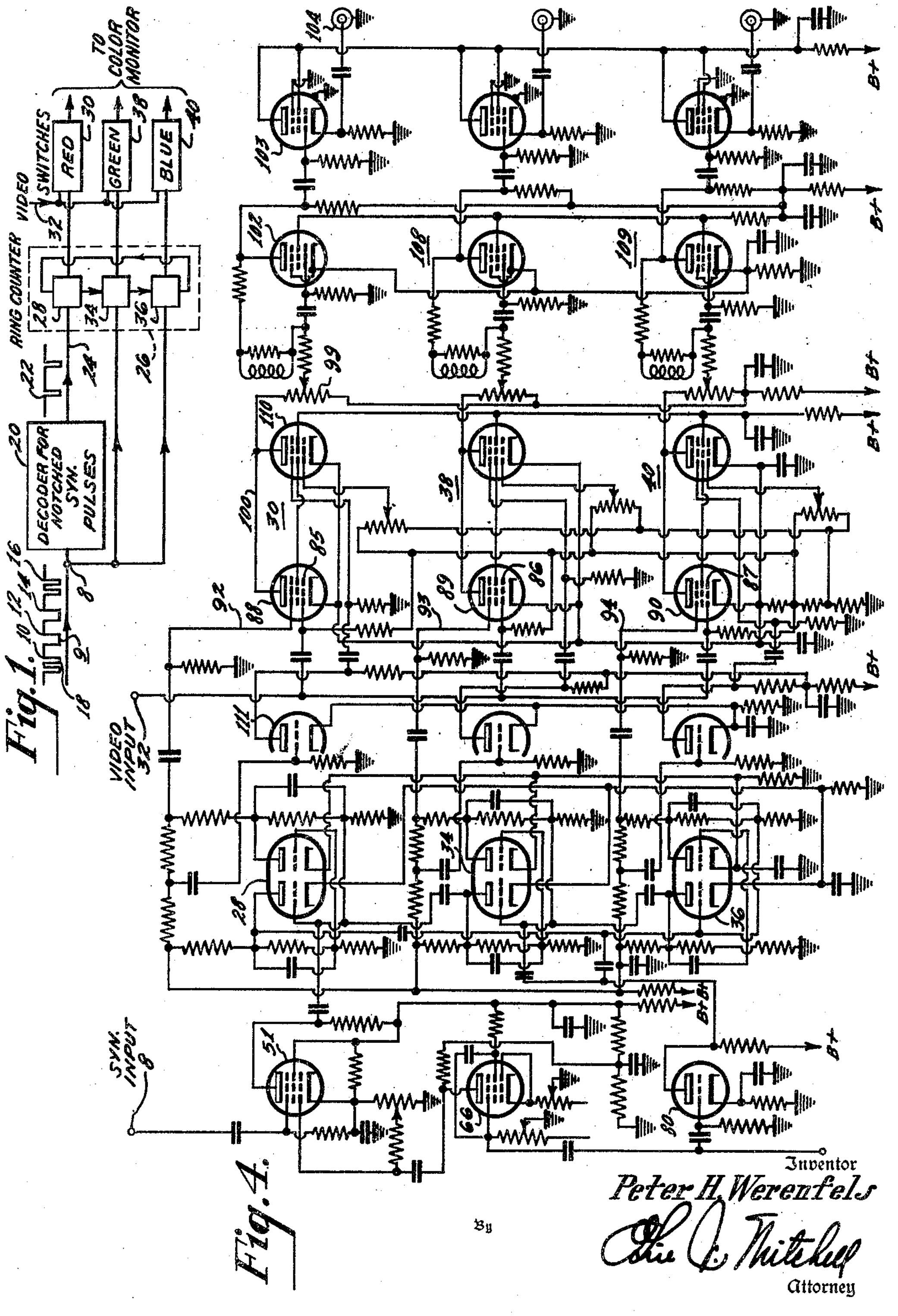
Figure 1 is a block diagram circuit of a portion of a television receiving system embodying the invention.

Referring to the drawing, and in particular to Figure 1, preferred synchronization signals in accordance with this invention are shown at a synchronization input terminal 8. Each sequence of the synchronization signals comprises a waveform 9 having a series of three successive pulses 10, 12 and 14, the first of which has superimposed thereon near the center a single narrow notch 18 of opposite polarity to the pulses. The notch 18 comprises a color flag which may be used for color phasing purposes. The two succeeding synchronization pulses of the sequence 12 and 14 are not notched, but the first pulse 16 of the next sequence has a similar notched color flag.

The sequence may be directed to any desired color combination, but is illustrated in the preferable system, in which red, green and blue color information signals are sequentially transmitteed. Additional colors may be included in the color sequence, if desired, and the invention is not limited to a three-color sequential system, nor to the given order of color sequence.

As shown in the drawing, the color flag or notch 18 is superimposed upon the synchronizing pulse corresponding to the red color signals in the red, green, blue sequence. However, obviously the flag may be used to code any other color if desired. Also, it is noted that as shown, the synchronization pulses may be representative of a portion of the incoming horizontal synchronization pulse information, which has been separated from the video signal. The synchronization pulses are not shown to scale, and they are not limited to horizontal pulses but are illustrative of the synchronization pulse information which might comprise successive vertical synchronization pulses, or the like, which have been properly separated from the transmitted video intelligence signal and inserted at the synchronization input terminal 8. In any event, the pulses preferably will be of a somewhat similar waveform to that shown.

A decoder 20 or synchronization separator circuit for the notched synchronization pulses is connected to the synchronization input terminal 8 and provides an output signal comprising a cyclically reoccurring pulse 22 corresponding to the notch or color flag 18 of the input composite synchronization wave. This separated pulse 22 is inserted at the input lead 24 of the ring counter 26 to initiate the ring counter sequence. As operation of the first ring counter stage 28 is initiated, the red switch or gate circuit 30 passes video information from the video input lead 32 to the color monitor.

Each succeeding input pulse will then cause succeeding stages of the counter 34, 36 to open other gating or switching circuits 38 and 40 and pass the color phased green or blue video information to the color monitor. At the end of the sequence, the next color flag indication, such as that shown upon synchronization pulse 16, will again initiate the ring counter sequence and open the red gating circuit 30. The counter will keep in step since each succeeding synchronization pulse actuates the next succeeding counter stage.

The above described decoding circuit has been found very stable in operation. This may be attributed to a large extent to the synchronization pulse waveform. For example, a single notch 18 at the center of a synchronization pulse 10 is not easily lost in transmission or in the receiver separation circuits. Further, such a pulse is easily provided, such as by means shown in U. S. Patent No. 2,132,654 to J. P. Smith, issued October 11, 1938.

If a separate pulse for each color were superimposed at a different position upon the time base of the incoming synchronization pulses, very complicated separation circuits would be required. Noises or other disturbances received along with the synchronization pulse would then cause erratic operation of the decoding system. Therefore, with the disclosed synchronization pulse waveform, the decoder 20 for the notched synchronization pulses is simplified.

In addition the entire system is made more stable by the means of this invention, since each gating circuit is firmly and vigorously actuated by one of the ring counter stages. Each ring counter stage is in turn firmly actuated by the successive transmitted synchronization pulses, and the counter sequence is initiated by the color flag signals. Each color signal therefore is readily decoded from the transmitted information at the proper instant since the color phasing is not dependent upon the free running frequency of an oscillator circuit. Thus, a simplified system is provided in which both very stable synchronization and color selection might be accomplished, with a minimum of circuitry and without any moving mechanical parts.

Figure 2:
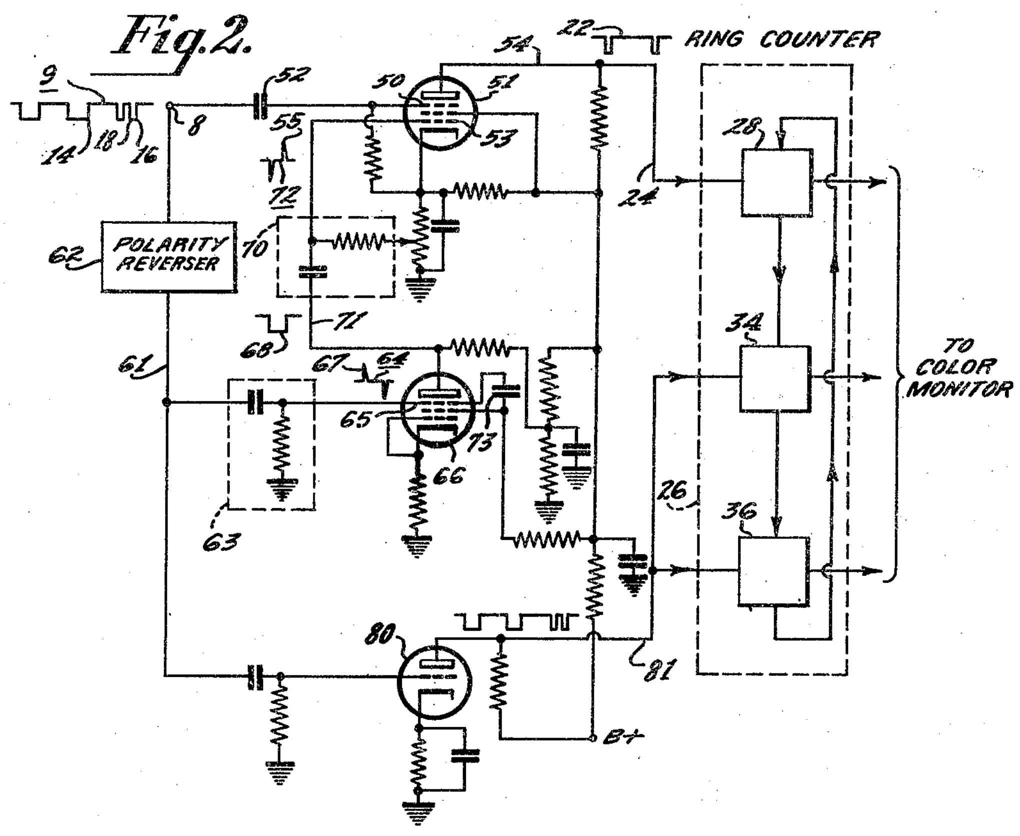
Figure 2 is a schematic circuit diagram of a synchronization circuit according to the invention.

A synchronization pulse separator or decoder and a ring counter amplifier circuit is shown in detail in Figure 2, in connection with a high level sampling system. In this circuit, which operates upon the same general principles as that described in connection with Figure 1, the ring counter output pulses may be used directly to gate or switch the color monitor to the proper high level video signal, which is directly applied to the monitor. Since the differences between high level and low level sampling are well known in the art, they will not be discussed herein in detail. It might be noted, however, that the high level sampling provides a simpler color phasing system than would be possible in a low level sampling system, and for that reason is preferred.

Figure 3:
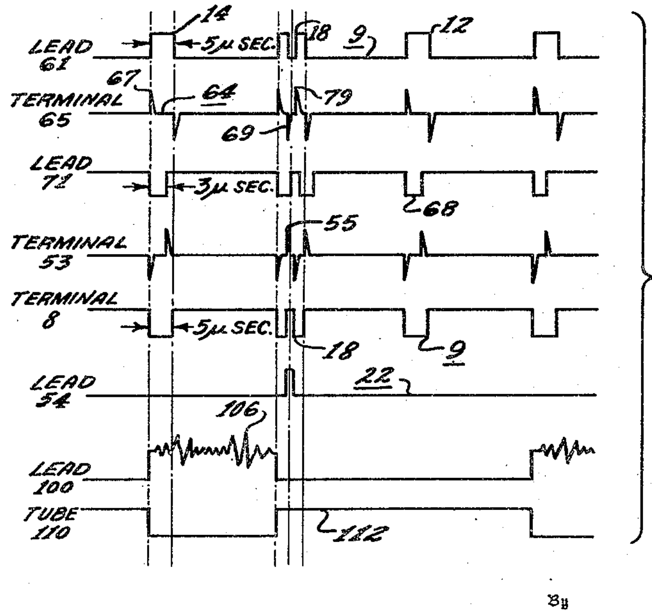
Figure 3 is a graphical illustration of waveforms used to explain operation of the invention; and, Figure 4 is a detailed schematic diagram of circuits of the invention as shown in block diagram in Figure 1.

Throughout the drawing, like reference numerals will represent like circuit components. Likewise, the wave forms of Figure 3 are identified by reference numerals corresponding to the circuit connections at which they are found to make clear the operation of the invention when considered in connection with the description of the detailed circuit diagrams. The pulse widths of the synchronization pulses are those used in accordance with present standards, and the remaining pulse widths are chosen for best operation therewith, but need not be limited to the values given.

Referring now concurrently to Figures 2 and 3, the synchronization input terminal 8 is provided with a synchronization wave form 9, of the general character described. The synchronization pulses are negative and have superimposed near the center of one pulse in each sequence a narrow notch 18, which comprises a color flag. This negative synchronization pulse is inserted at the suppressor grid 50 of a color flag separation or gating amplifier tube 51 by means of a coupling capacitor 52.

The suppressor grid 50 comprises one input terminal of the tube 51 and the control grid 53 comprises a second input terminal. The tube 51 is provided with proper operating voltages so that the notch 18 may be separated from the incoming synchronization pulses, to comprise the wave form 22 at the output lead 54 of the separation tube 51. Thus, when the notch 18 is inserted at the suppressor grid 50 there is in effect a positive pulse for a short duration, and the tube operating voltages are provided such that when a positive keying or gating pulse 55 is simultaneously inserted at the second input terminal, or control grid 53, the tube will conduct heavily to provide the desired output wave pulse 22.

Thus, a positive pulse 55 is derived from the incoming synchronization wave form 9 to coincide with the color flag notch 18. As a result the negative pulses 22 are formed, which as above explained, initiate counting of the ring counter 26 by providing a negative pulse at the lead 24 of the first counter stage 28. The output signal from this counter stage will comprise a gating pulse for switching the color monitor in phase with the video signal corresponding to one color in the color sequence. The first counter stage provides a gating pulse for the monitor stage of the color which is identified by the notch 18.

Input synchronization pulses for the remaining counter stages are also derived from the incoming negative synchronization wave form 9. This wave form 9 is converted into a positive wave form at the lead 61 by a polarity reversing circuit 62. Each synchronization pulse is then modified by the resistance-capacitance (RC) network 63 to provide a differentiated wave form 64 at the suppressor grid, or input terminal 65, of a single shot oscillator tube 66 in the color flag separation circuit. The output circuit of the oscillator tube 66 provides an essentially square wave output pulse 68 of about half the duration of the corresponding incoming synchronization pulse 12, when it is triggered by a positive input pulse 67. The width of the pulse 68 is adjusted by the value of the capacitor 73 between the suppressor and screen grids of the tube 66. The width of the pulse 68 is such that its trailing edge coincides approximately with the center of the color flag notch 18.

A further RC network 70 is provided in the output lead 71 of the amplifier tube 66 to differentiate the converted negative pulse 68 and provide the input waveform 72 at the control grid 53 of the color flag separation tube 51. Since the converted synchronization pulse 68 is of approximately half the duration of the incoming synchronization pulse 14, the positive or keying portion 55 of the pulse, caused by the differentiated trailing edge, will correspond in time to the center portion of the incoming synchronization pulses. Therefore, when the synchronization pulse 16 and the color flag 18 superimposed thereupon, arrives, the positive portion of the keying pulse 55 will coincide with the positive going color flag notch 18 at the separator tube 51 to cause conduction of the tube 51 and thus the provision of the desired output wave form 22. Figure 3 shows each of the various aforementioned wave forms in the proper time sequence relation so that the operation of the separation circuit may be readily followed.

Since differentiating and one shot oscillator circuits are well known, the circuits of the invention for obtaining the proper wave forms need not be described in detail. Also, since only certain of the positive portions 67 of the differentiated synchronization pulse wave form 64 are used at the input terminals 65 of the amplifier tube 66, the major portion of the waveform is for that reason not important. It is noted in this respect, however, that the incoming color flag notch 18 will cause an additional unused positive pulse 79, which occurs during the period when the suppressor grid of the separator tube 51 is negative.

A further electron tube 80 is provided as a synchronization pulse amplifier which provides at its output lead 81 synchronization pulses for actuation of the succeeding ring counter stages 34 and 36, in the manner hereinbefore described. A synchronization pulse amplifier such as this is necessary in many television systems to obtain a pulse of increased amplitude. It is noted that the color flag output wave 22 is amplified in the separation tube so that a further amplifier is not needed. Thus the circuit is simplified over the usual synchronization pulse separator circuit.

In Figure 4 the operation of the color flag separation tubes 51 and 66, and the synchronization amplifier tube 80 is identical to that explained in connection with Figure 2. The ring counter circuit is shown having electron tubes 28, 34 and 36 representing the respective counter stages. Since counter circuits of this type are well known in the art, a detailed description of their operation is unnecessary, for an understanding of the present invention. Any conventional ring counter may be used, and the invention is not to be limited to the exact circuit shown.

The circuit of Figure 4 is one which would be used in low level sampling television systems, and is therefore provided with separate color switching stages 30, 38 and 40, which are initiated by output signals from the ring counter stages 28, 34 and 36. A video input signal is inserted to the switching stages at the terminal 32. Therefore, the respective control electrodes or input terminals 85, 86, 87 of the switching tubes 88, 89 and 90 are provided with an appropriate video signal for three color sequential operation. The switching tubes are keyed at their respective suppressor grids by voltages derived from the output circuits 92, 93 and 94 of the corresponding counter stages 28, 34 and 36.

The output wave at the anode lead 100 of the first switching tube 88 will have a form such as shown in Figure 3, wherein the video signal appears when the switching tube is conducting. This video signal is inserted to a video amplifier stage 102, which is preferably of the type shown and described in the copending U. S. patent application of L. E. Barton, Serial No. 188,581, filed October 5, 1950, entitled Wide Band Amplifiers, and assigned to the same assignee as this invention. It is to be recognized, of course, that such a video amplifier is preferred since it gives improved operation, but that the present invention is not limited thereto, and any suitable video amplifier circuit may be used to provide the requisite amount of video output voltage for the low level sampling system operation. Color balancing may be accomplished by varying the video gain in each of the individual channels by means such as the variable resistor 99 in the anode circuit of the amplifier stage 102, as more fully explained in the copending application.

Coupled to the video amplifier stage 102 is a cathode follower 103 for providing proper impedance matching between the amplifier and the color monitor, which may be connected to the color monitor terminal 104 for operation during one portion of the color sequence. The succeeding color switching stages 89 and 90 and the corresponding video amplifiers 108 and 109 operate in a manner identical to those described, although of a different time phase and in a sequence corresponding to the sequence of the transmitted video color information.

At the output lead 100 of the gating tube 88 the video signal 106, as shown in Figure 3, is superimposed upon a direct current (D.-C.) rectangular wave form. Such a D.-C. component will disturb the incoming brightness level of the video signal if uncompensated. There is provided a compensating amplifier 110, which by medium of the phase reversing tube 111 is connected to the ring counter to operate in opposite phase to the gating tube 88. Therefore, output lead 100 of the video gating tube 88 is provided a direct current compensating wave form 112 of opposite phase to that provided by the D.-C. conduction wave of the switching tube 88. It is easily recognized that the D.-C. level of the incoming video signal will remain undisturbed, since the superposition of the two waves cancels the D.-C. component. True indication of the brightness level for each color will thus be established at the input terminals to the color monitor system.

There is provided in accordance with the invention, an improved system for color phasing in television systems. The color phasing system comprises a ring counter in which each step is actuated in sequence by incoming synchronization pulses, and which is phased for each sequence by incoming color flags superimposed upon the synchronization pulses. It is to be recognized that the ring counter in combination with the phasing and synchronization pulse circuits provides improved stabilized gating of the video signals. The ring counter may be used in accordance with one phase of the invention in combination with a color phasing system to provide stable sampling operation. The described synchronization pulse separator circuit, which may be used with the synchronization wave form described, is simple in operation and is preferred in accordance with a further phase of the invention. Apparatus embodying the aforedescribed features and phases of the invention is defined in the appended claims.

What is claimed is:

1. In a television system the combination of: an input terminal adapted to receive signals comprising a plurality of electrical video signals in a given sequence corresponding to a plurality of colors in which the signals are identified by synchronization pulses and one color is identified by color flag information superimposed upon one synchronization pulse in each sequence, a multi-stage ring counter circuit having one stage for each of said colors, a color monitor system, an output circuit for each of said counter stages coupled to said monitor for providing an output voltage adapted for gating a corresponding color circuit in said color monitor, means coupled between said input terminal and ring counter for actuating each stage of said ring counter sequentially in accordance with said synchronization pulses and means for color phasing said ring counter in accordance with said color flag information.

2. In a television system for receiving a plurality of electrical video signals in a given sequence corresponding to a plurality of colors, the combination comprising, means for providing a series of synchronization pulses having color flag information superimposed upon one synchronization signal in each color sequence, means for separating the color flage information from said synchronization pulses, a multi-stage ring counter circuit having one stage for each of said colors, a color monitor system, means for providing an incoming series of video signals having sequential portions thereof corresponding to each of said colors and having each sequential color portion identified by said synchronization pulses, means for gating said color monitor system for each color portion upon actuation of the corresponding counter stage, means for initiating the counter circuit sequence in accordance with said color flag information, and means for actuating each counting step of said counter circuit in accordance with each successive synchronization pulse to provide at the color monitor separated video signals which are both properly synchronized and properly phased with respect to said series of incoming video signals.

3. In a television system for receiving a plurality of electrical video signals in a given sequence corresponding to a plurality of colors, the combination comprising means for providing a series of synchronization pulses for each of said colors, means providing color flag information comprising a relatively narrow notch in the center of one synchronization signal in each color sequence, and means for separating the notched color flag information from said synchronization pulses comprising a gating amplifier stage having two input terminals, circuit means providing said notched pulse at a first of said input terminals in such polarity that the notch is in a positive going direction and differentiating circuit means connected to the second of said input terminals for converting the synchronization pulses into a relatively narrow positive gating pulse coinciding in time relation with the notch at the first input terminal, whereby the amplifier stage conducts only during the time when the positive pulse and the notch coincide to provide an output pulse having essentially the same characteristics as the notch.

4. In a sequential color television system the combination of: an input terminal for receiving video signals transmitted in a given color sequence, accompanied by color identifying and synchronizing pulses, a multi-step ring counter circuit, means coupled with said input terminal and ring counter circuit for actuating said counter in accordance with the color identifying pulses, means providing a video signal, a color monitor coupled to said counter circuit and said video signal providing means, a plurality of color gate circuits in said monitor, each gate circuit being coupled to a respective stage of said ring counter circuit, and means coupled with said input terminal and one counter stage for initiating the counter circuit in phase with a particular received sequential color signals.

5. A decoding system for multicolor video signals having a plurality of color components, said signals including synchronization pulses for each color, comprising, in combination, a color monitor having a plurality of gated sections, one for each of said color signal components, a multi-step ring counter circuit connected with said monitor for gating different color sections of said color monitor; means providing said multi-color video signals at the inputs to said monitor sections; means providing pulses identifying one of the colors in said video signals, said identifying pulse providing means comprising, an amplifier stage having two input terminals, operating voltage circuits for causing said amplifier to function only if both of said terminals are simultaneously of a given polarity, means providing a composite voltage waveform including a color flag signal of said polarity at a first of said terminals, means for deriving from said composite wave a gating pulse to open the gated amplifier for said color flag signal, a circuit coupling said voltage pulse to the second of said terminals whereby an amplified color flag color identifying pulse is separated from said composite waveform and means coupled with said identifying pulse providing means and said ring counter for initiating said ring counter with said separated color identifying pulses.

6. A decoding system for multicolor video signals having a plurality of color components, said signals including synchronization pulses for each color, comprising, in combination, a color monitor having a plurality of gated sections, one for each of said color signal components, a multi-step ring counter circuit connected with said monitor for gating different color sections of said color monitor; means to actuate the steps of said counter by succeeding synchronization pulses, means providing said multi-color video signals at the inputs to said monitor sections; means providing pulses identifying one of the colors in said video signals, said identifying pulse providing means comprising, an amplifier stage having two input terminals, operating voltage circuits for causing said amplifier to function only if both of said terminals are simultaneously of a given polarity, means providing composite voltage waveform including a color flag signal of said polarity at a first of said terminals, means for deriving from said composite wave a gating pulse to open the gated amplifier for said color flag signal, a circuit coupling said voltage pulse to the second of said terminals whereby an amplified color flag color identifying pulse is separated from said composite waveform and means coupled with said identifying pulse providing means and said ring counter for initiating said ring counter with said separated color identifying pulses; said means for providing said multicolor video signals to said color monitor compriisng a separate video amplifier for each of the color signals, gating means for providing each of said amplifiers with conduction potentials only when a corresponding color signal is present auxiliary means for superimposing conduction potentials of opposite phase in the output circuit of said amplifier whereby the direct current level of the video signals is essentially undisturbed, means providing pulses identifying one of the colors in said video signal; and means coupled with said identifying pulse providing means and said ring counter for initiating said ring counter with said separated color identifying pulses.

References Cited in the file of this patent

UNITED STATES PATENTS

| | | |
|---|---|---|
| 2,306,386 | Hollyworth | Dec. 29, 1942 |
| 2,309,506 | Herbst | Jan. 26, 1943 |
| 2,319,789 | Chambers | May 25, 1943 |
| 2,378,746 | Beers | June 19, 1945 |
| 2,406,760 | Goldsmark | Sept. 3, 1946 |
| 2,505,589 | Somers | Apr. 25, 1950 |
| 2,539,440 | Labin | Jan. 30, 1951 |
| 2,546,972 | Chatterjea | Apr. 3, 1951 |